United States Patent [19]

Kindig et al.

[11] 4,289,529

[45] * Sep. 15, 1981

[54] PROCESS FOR BENEFICIATING SULFIDE ORES

[75] Inventors: James K. Kindig, Arvada; Ronald L. Turner, Golden, both of Colo.

[73] Assignee: Hazen Research, Inc., Golden, Colo.

[ * ] Notice: The portion of the term of this patent subsequent to Jun. 3, 1997, has been disclaimed.

[21] Appl. No.: 102,626

[22] Filed: Dec. 11, 1979

Related U.S. Application Data

[63] Continuation-in-part of Ser. No. 950,175, Oct. 10, 1978, abandoned.

[51] Int. Cl.$^3$ .............................................. C22B 1/00
[52] U.S. Cl. .......................................... 75/1 R; 75/7; 209/8; 209/9; 209/11
[58] Field of Search .................. 75/1 R, 1 T, 6–9, 75/21, 28, 72, 77, 82, 87, 111, 122; 423/23, 138, 25; 209/8, 9, 212–214, 127 R, 127 A; 427/47, 252, 253, 255, 129, 132

[56] References Cited

U.S. PATENT DOCUMENTS

| | | | |
|---|---|---|---|
| 933,717 | 9/1909 | Lockwood et al. | 209/214 |
| 1,053,486 | 2/1913 | Etherington | 75/1 R |
| 2,132,404 | 10/1938 | Dean | 423/25 |
| 2,332,309 | 10/1943 | Drummond | 427/252 |
| 2,612,440 | 9/1952 | Altmann | 75/0.5 |
| 2,944,883 | 7/1960 | Queneau et al. | 75/0.5 |
| 3,220,875 | 11/1965 | Queneau | 427/217 |
| 3,252,791 | 5/1966 | Frysinger et al. | 75/119 |
| 3,323,903 | 6/1967 | O'Neill et al. | 75/0.5 |
| 3,466,167 | 9/1969 | Illis et al. | 75/112 |
| 3,490,899 | 1/1970 | Krivisky et al. | 423/25 |
| 3,669,644 | 6/1972 | Sato | 423/25 |
| 3,671,197 | 6/1972 | Mascio | 75/6 |
| 3,758,293 | 9/1973 | Viviani et al. | 75/6 |
| 3,926,789 | 12/1975 | Shubert | 209/214 |
| 3,938,966 | 2/1976 | Kindig et al. | 44/1 R |
| 4,056,386 | 11/1977 | McEwan et al. | 423/417 |
| 4,098,584 | 7/1978 | Kindig et al. | 44/1 R |
| 4,119,410 | 10/1978 | Kindig et al. | 44/1 R |
| 4,120,665 | 10/1978 | Kindig et al. | 44/1 R |
| 4,187,170 | 2/1980 | Westcott | 209/8 |
| 4,205,979 | 10/1980 | Kindig et al. | 209/214 |

FOREIGN PATENT DOCUMENTS

| | | | |
|---|---|---|---|
| 28375 | 7/1931 | Australia | 75/6 |
| 179095 | 7/1954 | Austria | 75/112 |
| 452790 | 11/1980 | Canada | 75/6 |
| 119156 | 8/1959 | U.S.S.R. | 209/212 |

OTHER PUBLICATIONS

Henderson, J. G., et al. *Metallurgical Dictionary*, Rheinhold Publishing Corp., N. Y. p. 227, (1953).
Sinclair, J. S.; *Coal Preparation and Power Supply at Collieries*, London pp. 15–17, (1962).

*Primary Examiner*—Michael L. Lewis
*Attorney, Agent, or Firm*—Sheridan, Ross, Fields & McIntosh

[57] ABSTRACT

In a process for beneficiating one or more mineral values of sulfide ores by treating the sulfide ore with a metal containing compound under conditions such as to selectively enhance the magnetic susceptibility of the mineral values to the exclusion of the gangue in order to permit a separation between the values and gangue, the improvement comprising pretreating the sulfide ore by heating it to a temperature of at least about 80° C. for at least about 0.1 hours.

63 Claims, No Drawings

PROCESS FOR BENEFICIATING SULFIDE ORES

CROSS-RELATED PATENT APPLICATIONS

This application is a continuation-in-part application of U.S. Ser. No. 950,175 filed Oct. 10, 1978 now abandoned.

TECHNICAL FIELD

This invention relates to a means for treating sulfide ores to separate the mineral value(s) from gangue material by selectively enhancing the magnetic susceptibility of the mineral value(s) so that they may be separated from the gangue.

BACKGROUND ART

As is well-known, mining operations in the past for recovering various metals, e.g., lead, copper, have utilized high grade ore deposits where possible. Many of these deposits have been exhausted and mining of lower grade ores is increasing. The processing of these leaner ores consumes large amounts of time, labor, reagents, power and water with conventional processing.

In addition to the increased expense associated with the extraction of these metals from low grade ores, proposed processes for separation of certain of the sulfide ores are technically very difficult and involve elaborate and expensive equipment. In many cases the expense incurred by such separation would be greater than the commercial value of the metal, such that the mineral recovery, while theoretically possible, is economically unfeasible.

Copending patent application "Process for Beneficiating Sulfide Ores", Ser. No. 086,830 filed Oct. 22, 1979 teaches the treatment of sulfide ores with a metal containing compound under conditions such as to selectively enhance the magnetic susceptibility of the mineral values to the exclusion of the gangue, allowing for a separation of these values from the gangue. However, it appears as though the presence of various volatile compounds within the ore can have an adverse effect on the recovery of mineral values in a process which enhances the magnetic susceptibility of the mineral values. Pretreating the raw sulfide ore with heat in order to volatilize these various components, and thereafter selectively enhancing the magnetic susceptibility of the mineral values so that they may be separated from the gangue, substantially enhances the effectiveness of the separation of the mineral values from the gangue. Additionally, pretreatment with heat, optionally in the presence of various gaseous additives, enhances the basic process, apparently as a result of differing mechanisms.

DISCLOSURE OF THE INVENTION

The process of the present invention entails heat pretreatment of a sulfide ore selected from the group consisting of the metal sulfides of Groups VIB, VIIB, VIIIB, IB, IIB, IIIA, IVA, and VA, and thereafter treating the sulfide ore with a metal containing compound under conditions such that the magnetic susceptibility of the ore is selectively enhanced to the exclusion of the gangue. The affected ore values may then be separated from the gangue, preferably by means of a magnetic separation.

The pretreatment is conducted at a temperature of at least about 80° C., preferably for a time period of at least about 0.1 hours. The heat pretreatment step may also be conducted in the presence of one or more gaseous additives, for example, steam, nitrogen, hydrogen, carbon monoxide, hydrogen sulfide, ammonia, and sulfur dioxide.

BEST MODE FOR CARRYING OUT THE INVENTION

The process of the present invention is particularly useful for concentrating sulfide minerals. The process employs the heat pretreatment of the sulfide ore with heat or heat in conjunction with a gaseous additive, and thereafter treating the ore with a metal containing compound under processing conditions such as to selectively enhance the magnetic susceptibility of various mineral values contained within the ore. The treated mixture can then be subjected to a physical separation process to produce a beneficiated product.

The heat pretreatment of the present invention is conducted prior to initiating the reaction with the metal containing compound. This pretreatment essentially comprises heating the sulfide ore in order to render the ore more receptive to the magnetic enhancement reaction. The temperature and time of heating are interrelated, and essentially higher temperatures require less time. The particular time and temperature for the pretreatment process will depend on the particular ore being beneficiated and also the metal containing compounds with which the ore is later treated. The pretreatment may occur over a relatively broad range of temperatures; however, the temperature must not exceed the decomposition temperature of the mineral value, or the temperature above which substantial vaporization would occur. It is generally preferred that the pretreatment essentially comprise heating the ore to a temperature of at least about 80° C., more preferably from about 125° C. to about 450° C. and most preferably to a temperature of from about 175° C. to about 250° C. It is preferred that this heat pretreatment be done for a time period of at least about 0.1 hours, more preferably from about 0.20 to about 4 hours, and most preferably from about 0.25 to about 2 hours.

The heat pretreatment need not be immediately followed by the magnetic enhancement reaction. Hence, the ore may be permitted to cool to ambient temperature, or any other convenient temperature, prior to conducting the magnetic susceptibility enhancement reaction. However, if the heat pretreatment is conducted at a temperature greater than the temperature of the magnetic enhancement reaction, the ore must be cooled to at least the temperature at which the magnetic enhancement reaction will be conducted.

It is generally preferred to maintain the heat pretreatment temperature at least slightly above the temperature of the magnetic enhancement reaction. This is not an imperative requirement; however, improved results are generally accomplished. The pretreating by heating the ore is believed to change the ore either physically or chemically and/or to volatilize various components which can interfere with the magnetic enhancement reaction. Therefore, if the magnetic enhancement reaction is conducted at a temperature in excess of the pretreatment temperature, it is possible that additional volatile components could somewhat detrimentally affect the magnetic enhancement reaction.

The heat pretreatment step may be conducted in the presence of one or more gaseous additives, and this is preferable under many circumstances. Examples of suitable gaseous additives include steam, nitrogen, hydrogen, carbon monoxide, carbon dioxide, ammonia, hydrogen sulfide, sulfur dioxide, methane, air, ethane, propane, butane and other hydrocarbon compounds in the gaseous state at the pretreatment temperature. Preferred gaseous additives include steam, nitrogen, hydrogen, carbon monoxide, hydrogen sulfide, ammonia and sulfur dioxide.

When these additives are employed, it is preferable that they be employed in an amount of at least about 2, more preferably at least about 12 and most preferably at least about 120 cubic meters per hour per metric ton of ore being processed.

A particularly preferred additive is steam. Heat pretreatment with steam is preferably conducted within a temperature range of from at least about 100° C., more preferably from about 150° C. to about 450° C., and most preferably from about 175° C. to about 250° C. Preferably, the pretreatment should be conducted for at least about 0.1 hours, more preferably for at least about 0.25 hours, and most preferably for at least 0.5 hours. The amount of water preferably ranges from about 1 weight percent to about 50 weight percent, more preferably from about 5 weight percent to about 30 weight percent and most preferably from about 10 weight percent to about 25 weight percent, based on the weight of the metal sulfide ore being treated.

After the ore has been subjected to this heat pretreatment, it is then treated with a metal containing compound in order to selectively enhance the magnetic susceptibility of its various mineral values.

"Enhancing the magnetic susceptibility" of the ore as used herein is intended to be defined in accordance with the following discussion. Every compound of any type has a specifically defined magnetic susceptibility, which refers to the overall attraction of the compound to a magnetic force. An alteration of the surface magnetic characteristics will alter the magnetic susceptibility. The metal treatment of the inventive process alters the surface characteristics of the ore particles in order to enhance the magnetic susceptibility of the particles. It is to be understood that the magnetic susceptibility of the original particle is not actually changed, but the particle itself is changed, at least at its surface, resulting in a different particle possessing a greater magnetic susceptibility than the original particle. For convenience of discussion, this alteration is termed herein as "enhancing the magnetic susceptibility" of the particle or ore itself.

The sulfide minerals which are capable of undergoing a selective magnetic enhancement in accordance with the process include the metal sulfides of groups VIB, VIIB, VIIIB, IB, IIB, IIIA, IVA, and VA. These sulfides preferably specifically include the sulfides of molybdenum, tungsten, manganese, rhenium, iron, ruthenium, osmium, cobalt, rhodium, iridium, nickel, palladium, platinum, copper, gold, silver, zinc, cadmium, mercury, tin, lead, arsenic, antimony and bismuth.

The gangue minerals from which the metal sulfides can be separated include those minerals which do not undergo a sufficient magnetic susceptibility enhancement as a result of the process. These gangue minerals include, for example, silica, alumina, gypsum, muscovite, dolomite, calcite, albite and feldspars, as well as various other minerals. The term gangue as used herein refers to inorganic minerals with which sulfide ores are normally associated. The term does not include coal.

In those ores which contain naturally relatively strongly magnetic constituents, such as magnetite, the magnetic material may first be removed by passing the mixture through a magnetic separator. The nonmagnetic portion obtained by this precleaning step is then subjected to the treatment with a metal containing compound.

Prior to the treatment, the ore must be ground to liberate the metal sulfide particles from the gangue particles, if the respective components do not already exist in this liberated state. The ore may be crushed finer than necessary to achieve liberation, but this is not generally economically feasible. It is generally satisfactory to crush the ore to at least about minus 14 mesh, although many ores require grinding to minus 65 mesh or finer.

Numerous metal containing compounds are capable of enhancing the magnetic susceptibility of the metal sulfides in accordance with the invention. Many iron containing compounds possess the capability of enhancing the magnetic susceptibility of the mineral values of the ore, as long as the compound is adaptable so as to bring the iron in the compound into contact with the mineral value under conditions such as to cause an alteration of at least a portion of the surface of the mineral value.

Iron containing compounds capable of exerting sufficient vapor pressure, with iron as a component in the vapor, so as to bring the iron into contact with the value at the reaction temperature are suitable, as well as other organic and inorganic iron containing compounds which can be dissolved and/or "dusted" and brought into contact with the mineral value contained within the ore. Preferred compounds within the vapor pressure group are those which exert a vapor pressure, with iron as a component in the vapor, of at least about 10 millimeters of mercury, more preferably of at least about 25 millimeters of mercury and most preferably of at least about 50 millimeters of mercury at the reaction temperature. Examples of groupings which fall within this vapor pressure definition include ferrocene and its derivatives and beta-diketone compounds of iron. Specific examples include ferrocene and iron acetylacetonate.

Other organic compounds which may be utilized to enhance the magnetic susceptibility include those which may be homogeneously mixed with a carrier liquid and brought into contact with the components of the ore. Such mixtures include, for example, solutions, suspensions and emulsions. These compounds must be such as to provide sufficient metal to contact the surface of the mineral value. Suitable carrier liquids include, for example, acetone, petroleum, ether, naphtha, hexane, benzene and water; but this, of course, is dependent upon the particular metal compound being employed. Specific groupings include, for example, ferrocene and its derivatives and the carboxylic acid salts of iron, such as, iron octoate, iron naphthenate, iron stearate and ferric acetylacetonate.

Additionally, solid organic iron containing compounds capable of being directly mixed with the ore in solid form possess the capability of enhancing the magnetic susceptibility of the metal sulfides. The compound must be in solid form at the mixing temperature and be of sufficiently fine particle size in order to be able to be well dispersed throughout the ore. The particle size is preferably smaller than about 20 mesh, more preferably smaller than about 100 mesh and most preferably smaller than about 400 mesh. Compounds within this grouping include ferrocene and its derivatives, iron salts of organic acids and beta-diketone compounds of iron.

Specific examples include ferrous formate, 1,1'-diacetyl ferrocene and 1,1'-dihydroxymethyl ferrocene.

Various inorganic compounds are also capable of producing an enhanced magnetic susceptibility. Preferred inorganic compounds include ferrous chloride, ferric chloride and the metal carbonyls, including, for example, iron, nickel, cobalt, molybdenum, tungsten and chromium carbonyls and derivatives of these compounds. Iron carbonyl is a preferred carbonyl for imparting this magnetic susceptibility, particularly iron pentacarbonyl, iron dodecacarbonyl, and iron nonacarbonyl. The more preferred metal containing compounds capable of enhancing the magnetic susceptibility are iron pentacarbonyl, ferrocene and ferric acetylacetonate, with iron pentacarbonyl being the most preferred.

The process is applied by contacting the iron containing compound with the ore at a temperature wherein the iron containing compound selectively decomposes or otherwise reacts at the surface of the metal sulfide particles to alter their surface characteristics, while remaining essentially unreactive, or much less reactive, at the surface of the gangue particles. The temperature of the reaction is a critical parameter, and dependent primarily upon the particular compound and the particular ore. The preferred temperature can be determined by heating a sample of the specific iron containing compound and the specific ore together until the decomposition reaction occurs. Suitable results generally occur over a given temperature range for each system. Generally, temperatures above the range cause non-selective decomposition while temperatures below the range are insufficient for the reaction to occur.

While as indicated above, techniques other than vapor injection methods may be employed as applicable depending upon the metal containing compound being utilized, the following discussion primarily applies to vapor injection techniques, specifically iron pentacarbonyl, as these are generally preferred. Similar considerations, as can be appreciated, apply to the other described techniques.

The preferred temperatures when iron pentacarbonyl is employed as the treating gas are primarily dependent upon the ore being treated. It is generally preferred to select a temperature which is within a range of 125° C., more preferably 50° C. and most preferably 15° C. less than the general decomposition temperature of the iron carbonyl in the specific system. The general decomposition temperature is intended to mean the temperature at which the iron carbonyl decomposes into iron and carbon monoxide in indiscriminate fashion, causing a magnetic enhancement of the gangue as well as the metal sulfide. The "specific system" is intended to include all components and parameters, other than, of course, temperature of the precise treatment, as the general decomposition temperature varies with different components and/or different parameters. This decomposition temperature range can be readily determined by analytical methods and often a trial and error approach is preferred to determine the precise temperature range for each specific system.

The amount of the metal containing compound used and the time of treatment can be varied to maximize the selective enhancement treatment. With respect to iron carbonyl, the preferred amount employed is from about 0.1 to about 100 kilograms per metric ton of feed, more preferably from about 1 to about 50 kilograms per metric ton of feed and most preferably from about 2 to 20 kilograms per metric ton of feed. The treatment reaction is generally conducted for a period of time of from about 0.05 to about 4 hours, more preferably from about 0.15 to about 2 hours and most preferably from about 0.25 to about 1 hour.

After the feed mixture containing the metal sulfide values has been treated with a metal containing compound, it can then be subjected to a magnetic separation process to effect the separation of the sulfides. Any of many commercially available magnetic separators can be used to remove these values from the gangue. For example, low or medium intensity separations can be made with a permanent magnetic drum separator, electromagnetic drum separators, induced roll separators or other configurations known to those skilled in the art. Since most sulfides are liberated at a mesh size of 65 mesh or finer, a wet magnetic separation process is more effective. Thus, high intensity, high gradient wet magnetic separators are preferred. Also electrostatic techniques may be employed as the primary separation means, or in addition to the magnetic separation means. The selective change in surface characteristics changes the electrical conductivity of the particle in analogous fashion to changing the particle's magnetic characteristics. Additionally, due to the fact that the sulfide surface characteristics have been altered, the sulfides are often more amenable to processes such as froth flotation and chemical leaching.

EXAMPLE 1

Samples of different minerals were ground to a minus 65 mesh and mixed with minus 65 mesh silica sand to produce 3 percent synthetic ores with the exception of molybdenite which was a 5 percent ore. A sample of each ore was pretreated with steam by rapidly heating a reactor containing the sample to 200° C. under a nitrogen purge; thereafter the sample was treated for 15 minutes with 200 kilograms of steam per metric ton of sample. The reactor was then cooled under a nitrogen purge. Following this pretreatment, each sample was treated with 8 kilograms of iron pentacarbonyl per metric ton of sample for 30 minutes at the temperature indicated in Table 1. For comparative purposes, a sample of each of these ores was only pretreated with the steam in the manner indicated above. All of the samples were then subjected to a wet magnetic separation process, and the analyses of the products thus obtained are presented below in Table 1.

TABLE 1

| Mineral | Pretreatment | Temp. of $Fe(CO)_5$ Treatment (°C.) | Product | Weight (%) | Grade (%) | Metal | Metal Distr. |
|---|---|---|---|---|---|---|---|
| Galena | Steam | 135 | Magnetic | 3.9 | 52.7 | Pb | 86.6 |
| | | | Nonmagnetic | 96.1 | 0.33 | Pb | 13.4 |
| | | | Calculated Feed | 100.0 | 2.37 | Pb | 100.0 |
| Galena | Steam blank | — | Magnetic | 0.48 | 17.2 | Pb | 3.3 |
| | | | Nonmagnetic | 99.52 | 2.42 | Pb | 96.7 |

TABLE 1-continued

| Mineral | Pretreatment | Temp. of Fe(CO)$_5$ Treatment (°C.) | Product | Weight (%) | Grade (%) | Metal | Metal Distr. |
|---|---|---|---|---|---|---|---|
| | | | Calculated Feed | 100.0 | 2.49 | Pb | 100.0 |
| Molybdenite | Steam | 135 | Magnetic | 36.4 | 0.45 | Mo | 89.0 |
| | | | Nonmagnetic | 63.6 | 0.032 | Mo | 11.0 |
| | | | Calculated Feed | 100.0 | 0.18 | Mo | 100.0 |
| Molybdenite | Steam blank | — | Magnetic | 0.48 | 2.73 | Mo | 7.8 |
| | | | Nonmagnetic | 99.52 | 0.156 | Mo | 92.2 |
| | | | Calculated Feed | 100.0 | 0.168 | Mo | 100.0 |
| Stibnite | Steam | 85 | Magnetic | 1.2 | 24.1 | Sb | 44.4 |
| | | | Nonmagnetic | 98.8 | 0.367 | Sb | 55.6 |
| | | | Calculated Feed | 100.0 | 0.652 | Sb | 100.0 |
| Stibnite | Steam Blank | — | Magnetic | 0.64 | 4.50 | Sb | 3.3 |
| | | | Nonmagnetic | 99.36 | 0.847 | Sb | 96.7 |
| | | | Calculated Feed | 100.0 | 0.87 | Sb | 100.0 |
| Smaltite | Steam | 115 | Magnetic | 0.72 | 4.96 | Co | 11.6 |
| | | | Nonmagnetic | 99.28 | 0.275 | Co | 88.4 |
| | | | Calculated Feed | 100.0 | 0.309 | Co | 100.0 |
| Smaltite | Steam blank | — | Magnetic | 0.84 | 2.40 | Co | 6.6 |
| | | | Nonmagnetic | 99.16 | 0.29 | Co | 93.4 |
| | | | Calculated Feed | 100.0 | 0.31 | Co | 100.0 |
| Chalcopyrite | Steam | 140 | Magnetic | 4.4 | 17.1 | Cu | 81.4 |
| | | | Nonmagnetic | 95.6 | 0.18 | Cu | 18.6 |
| | | | Calculated Feed | 100.0 | 0.924 | Cu | 100.0 |
| Chalcopyrite | Steam blank | — | Magnetic | 2.3 | 26.3 | Cu | 69.6 |
| | | | Nonmagnetic | 97.7 | 0.271 | Cu | 30.4 |
| | | | Calculated Feed | 100.0 | 0.87 | Cu | 100.0 |
| Orpiment | Steam | 110 | Magnetic | 12.6 | 9.06 | As | 85.8 |
| | | | Nonmagnetic | 87.4 | [0.22]* | As | 14.2 |
| | | | Calculated Feed | 100.0 | 1.33 | As | 100.0 |
| Orpiment | Steam blank | — | Magnetic | 0.61 | 10.8 | As | 5.0 |
| | | | Nonmagnetic | 99.39 | 1.27 | As | 95.0 |
| | | | Calculated Feed | 100.0 | 1.33 | As | 100.0 |
| Cinnabar | Steam | 190 | Magnetic | 3.0 | 23.9 | Hg | 54.8 |
| | | | Nonmagnetic | 97.0 | 0.61 | Hg | 45.2 |
| | | | Calculated Feed | 100.0 | 1.31 | Hg | 100.0 |
| Cinnabar | Steam blank | — | Magnetic | 0.72 | 14.9 | Hg | 7.0 |
| | | | Nonmagnetic | 99.28 | 1.43 | Hg | 93.0 |
| | | | Calculated Feed | 100.0 | 1.53 | Hg | 100.0 |
| Bornite | Steam | 140 | Magnetic | 15.1 | 8.95 | Cu | 89.9 |
| | | | Nonmagnetic | 84.9 | 0.178 | Cu | 10.1 |
| | | | Calculated Feed | 100.0 | 1.50 | Cu | 100.0 |
| Bornite | Steam blank | — | Magnetic | 2.4 | 49.5 | Cu | 80.0 |
| | | | Nonmagnetic | 97.6 | 0.304 | Cu | 20.0 |
| | | | Calculated Feed | 100.0 | 1.49 | Cu | 100.0 |
| Realgar | Steam | 95 | Magnetic | 33.3 | 3.88 | As | 89.0 |
| | | | Nonmagnetic | 67.7 | 0.24 | As | 11.0 |
| | | | Calculated Feed | 100.0 | 1.45 | As | 100.0 |
| Realgar | Steam blank | — | Magnetic | 0.53 | 2.25 | As | 0.8 |
| | | | Nonmagnetic | 99.47 | 1.56 | As | 99.2 |
| | | | Calculated Feed | 100.0 | 1.56 | As | 100.0 |
| Pentlandite | Steam | 105 | Magnetic | 2.6 | 7.65 | Ni | 91.1 |
| | | | Nonmagnetic | 97.4 | 0.02 | Ni | 8.9 |
| | | | Calculated Feed | 100.0 | 0.22 | Ni | 100.0 |
| Pentlandite | Steam blank | — | Magnetic | 3.0 | 7.93 | Ni | 49.5 |
| | | | Nonmagnetic | 97.0 | 0.25 | Ni | 50.5 |
| | | | Calculated Feed | 100.0 | 0.48 | Ni | 100.0 |
| Tetrahedrite | Steam | 117 | Magnetic | 2.5 | 4.65 | Cu | 70.5 |
| | | | Nonmagnetic | 97.5 | 0.05 | Cu | 29.5 |
| | | | Calculated Feed | 100.0 | 0.165 | Cu | 100.0 |
| Tetrahedrite | Steam blank | — | Magnetic | 2.9 | 5.18 | Cu | 83.8 |
| | | | Nonmagnetic | 97.1 | 0.03 | Cu | 16.2 |
| | | | Calculated Feed | 100.0 | 0.179 | Cu | 100.0 |

*Values in brackets are calculated from other analyses.

EXAMPLE 2

Samples of different synthetic ores were prepared as indicated in Example 1. A sample of each of the ores was pretreated with heat and nitrogen by rapidly heating a reactor containing the sample to 400° C. during a nitrogen purge which flowed at a rate of one reactor volume of gas being introduced into the system every 4.3 minutes and maintaining these conditions for 15 minutes. Then the reactor was cooled under the same type of nitrogen purge. Following this pretreatment each sample was treated with 8 kilograms of iron pentacarbonyl per metric ton of sample for 30 minutes at the temperature indicated for the particular ore in Table 1. For comparative purposes, a sample of each of the ores was merely subjected to the heat and nitrogen pretreatment in the manner indicated above. All of the samples were then subjected to a magnetic separation process. The results are presented in Table 2

TABLE 2

| Mineral | Pretreatment | Product | Weight (%) | Grade (%) | Metal | Metal Distr. |
|---|---|---|---|---|---|---|
| Galena | Heat & $N_2$ | Magnetic | 46.9 | 3.60 | Pb | 77.6 |
| | | Nonmagnetic | 53.1 | 0.917 | Pb | 22.4 |
| | | Calculated Feed | 100.0 | 2.18 | Pb | 100.0 |
| Galena | Heat & $N_2$ blank | Magnetic | 0.66 | 6.51 | Pb | 1.9 |
| | | Nonmagnetic | 99.34 | 2.24 | Pb | 98.1 |
| | | Calculated Feed | 100.0 | 2.27 | Pb | 100.0 |
| Sphalerite | Heat & $N_2$ | Magnetic | 33.1 | 5.08 | Zn | 90.7 |
| | | Nonmagnetic | 66.9 | 0.259 | Zn | 9.3 |
| | | Calculated Feed | 100.0 | 1.85 | Zn | 100.0 |
| Sphalerite | Heat & $N_2$ blank | Magnetic | 0.41 | 10.9 | Zn | 2.9 |
| | | Nonmagnetic | 99.59 | 1.53 | Zn | 97.1 |
| | | Calculated Feed | 100.0 | 1.57 | Zn | 100.0 |
| Molybdenite | Heat & $N_2$ | Magnetic | 41.2 | 0.29 | Mo | 94.0 |
| | | Nonmagnetic | 58.8 | 0.013 | Mo | 6.0 |
| | | Calculated Feed | 100.0 | 0.127 | Mo | 100.0 |
| Molybdenite | Heat & $N_2$ blank | Magnetic | 0.49 | 1.33 | Mo | 3.7 |
| | | Nonmagnetic | 99.51 | 0.172 | Mo | 96.3 |
| | | Calculated Feed | 100.0 | 0.178 | Mo | 100.0 |

EXAMPLE 3

Samples of different synthetic ores were prepared as indicated in Example 1 and a sample of each of the ores was pretreated with heat and hydrogen by rapidly heating the reactor containing the sample to 400° C. while purging it with nitrogen. This temperature was maintained for 15 minutes while hydrogen gas was passed through the reactor at a flow rate of one reactor volume of gas being introduced into the system every 4.3 minutes. The reactor was cooled under a purge of nitrogen gas. Each sample was then treated with 8 kilograms of iron pentacarbonyl per metric ton of samples for 30 minutes at the temperature indicated for the particular ore in Table 1. For comparative purposes, a sample of each of the ores was subjected to just the heat and hydrogen pretreatment. All of the samples were subjected to a wet magnetic separation process. The analyses of the products thus obtained are given below in Table 3.

TABLE 3

| Mineral | Pretreatment | Product | Weight (%) | Grade (%) | Metal | Metal Distr. |
|---|---|---|---|---|---|---|
| Galena | Heat & $H_2$ | Magnetic | 29.9 | 6.77 | Pb | 88.9 |
| | | Nonmagnetic | 70.1 | 0.359 | Pb | 11.1 |
| | | Calculated Feed | 100.0 | 2.28 | Pb | 100.0 |
| Galena | Heat & $H_2$ blank | Magnetic | 0.78 | 11.4 | Pb | 4.1 |
| | | Nonmagnetic | 99.22 | 2.11 | Pb | 95.9 |
| | | Calculated Feed | 100.0 | 2.18 | Pb | 100.0 |
| Sphalerite | Heat & $H_2$ | Magnetic | 12.8 | 11.6 | Zn | 87.4 |
| | | Nonmagnetic | 87.2 | 0.246 | Zn | 12.6 |
| | | Calculated Feed | 100.0 | 1.70 | Zn | 100.0 |
| Sphalerite | Heat & $H_2$ blank | Magnetic | 0.94 | 5.58 | Zn | 3.2 |
| | | Nonmagnetic | 99.06 | 1.58 | Zn | 96.8 |
| | | Calculated Feed | 100.0 | 1.62 | Zn | 100.0 |

EXAMPLE 4

Samples of different synthetic ores were prepared as indicated in Example 1. A sample of each of the ores was pretreated with heat and carbon monoxide by rapidly heating the reactor containing the sample to 400° C. while purging it with nitrogen. This temperature was maintained for 15 minutes while carbon monoxide gas was passed through the reactor at a flow rate of one reactor volume every 4.3 minutes. The reactor was then cooled under a purge of nitrogen gas. Each sample was then treated with 8 kilograms of iron pentacarbonyl per metric ton of sample for 30 minutes at the temperature indicated for the particular ore in Table 1. For comparative purposes, a sample of each ore was subjected to just the heat and carbon monoxide pretreatment. All of the samples underwent a wet magnetic separation process. The results are given below in Table 4.

TABLE 4

| Mineral | Pretreatment | Product | Weight (%) | Grade (%) | Metal | Metal Distr. |
|---|---|---|---|---|---|---|
| Galena | Heat & CO | Magnetic | 41.8 | 4.61 | Pb | 92.1 |
| | | Nonmagnetic | 58.2 | 0.286 | Pb | 7.9 |
| | | Calculated Feed | 100.0 | 2.09 | Pb | 100.0 |
| Galena | Heat & CO blank | Magnetic | 0.57 | 15.0 | Pb | 3.8 |
| | | Nonmagnetic | 99.43 | 2.20 | Pb | 96.2 |
| | | Calculated Feed | 100.0 | 2.27 | Pb | 100.0 |
| Molybdenite | Heat & CO | Magnetic | 8.6 | 1.97 | Mo | 96.3 |
| | | Nonmagnetic | 91.4 | 0.007 | Mo | 3.7 |
| | | Calculated Feed | 100.0 | 0.174 | Mo | 100.0 |
| Molybdenite | Heat & CO blank | Magnetic | 0.80 | 1.58 | Mo | 7.2 |
| | | Nonmagnetic | 99.20 | 0.164 | Mo | 92.8 |

TABLE 4-continued

| Mineral | Pretreatment | Product | Weight (%) | Grade (%) | Metal | Metal Distr. |
|---|---|---|---|---|---|---|
| | | Calculated Feed | 100.0 | 0.175 | Mo | 100.0 |

EXAMPLE 5

For comparative purposes, a sample of each of the same type of ores used in the preceeding examples were not given any pretreatment, but were just treated with 8 kilograms of iron pentacarbonyl per metric ton of feed for 30 minutes at the same temperature as used in the preceeding examples. Additionally, some samples of these ores were treated at the temperature of the iron carbonyl treatment but received no iron carbonyl. All of the samples were magnetically separated and the analyses of the products thus obtained are presented below in Table 5.

over a 2 hour period. The system was purged with nitrogen prior to and following the ferrocene treatment. Finally, the samples were subjected to a wet magnetic separation process. Each of the pretreatments, i.e., steam, heat plus nitrogen, heat plus hydrogen, and heat plus carbon monoxide, were conducted in the same manner as the pretreatments in Examples 1, 2, 3 and 4, respectively.

For comparative purposes, additional samples of the same type of ores were subjected to just the pretreatment followed by magnetic separation. Also, two samples of this ore were given no pretreatment. One was subjected to only the ferrocene treatment and the other

TABLE 5

| Mineral | Fe(CO)$_5$ Treatment | Temp. (°C.) | Product | Weight (%) | Grade (%) | Metal | Metal Distr. |
|---|---|---|---|---|---|---|---|
| Galena | yes | 135 | Magnetic | 45.8 | 3.07 | Pb | 69.5 |
| | | | Nonmagnetic | 54.2 | 1.14 | Pb | 30.5 |
| | | | Calculated Feed | 100.0 | 2.02 | Pb | 100.0 |
| Galena | no | 135 | Magnetic | 0.45 | 11.2 | Pb | 2.2 |
| | | | Nonmagnetic | 99.55 | 2.23 | Pb | 97.8 |
| | | | Calculated Feed | 100.0 | 2.27 | Pb | 100.0 |
| Sphalerite | yes | 135 | Magnetic | 36.5 | 3.50 | Zn | 70.5 |
| | | | Nonmagnetic | 63.5 | 0.842 | Zn | 29.5 |
| | | | Calculated Feed | 100.0 | 1.81 | Zn | 100.0 |
| Sphalerite | no | 135 | Magnetic | 0.37 | 12.9 | Zn | 2.7 |
| | | | Nonmagnetic | 99.63 | 1.71 | Zn | 97.3 |
| | | | Calculated Feed | 100.0 | 1.75 | Zn | 100.0 |
| Molybdenite | yes | 135 | Magnetic | 51.8 | 0.249 | Mo | 95.7 |
| | | | Nonmagnetic | 48.2 | 0.012 | Mo | 4.3 |
| | | | Calculated Feed | 100.0 | 0.135 | Mo | 100.0 |
| Molybdenite | no | 135 | Magnetic | 1.13 | 2.24 | Mo | 13.3 |
| | | | Nonmagnetic | 98.87 | 0.167 | Mo | 86.7 |
| | | | Calculated Feed | 100.0 | 0.190 | Mo | 100.0 |
| Stibnite | yes | 85 | Magnetic | 7.6 | 4.82 | Sb | 47.8 |
| | | | Nonmagnetic | 92.4 | 0.43 | Sb | 52.2 |
| | | | Calculated Feed | 100.0 | 0.77 | Sb | 100.0 |
| Smaltite | yes | 115 | Magnetic | 1.2 | 5.37 | Co | 22.1 |
| | | | Nonmagnetic | 98.8 | 0.23 | Co | 77.9 |
| | | | Calculated Feed | 100.0 | 0.29 | Co | 100.0 |
| Chalcopyrite | yes | 140 | Magnetic | 1.8 | 20.5 | Cu | 48.4 |
| | | | Nonmagnetic | 98.2 | 0.401 | Cu | 51.6 |
| | | | Calculated Feed | 100.0 | 0.77 | Cu | 100.0 |
| Orpiment | yes | 110 | Magnetic | 20.1 | 2.00 | As | 40.0 |
| | | | Nonmagnetic | 79.9 | 0.74 | As | 60.0 |
| | | | Calculated Feed | 100.0 | 0.99 | As | 100.0 |
| Cinnabar | yes | 190 | Magnetic | 1.6 | 48.1 | Hg | 43.9 |
| | | | Nonmagnetic | 98.4 | 1.0 | Hg | 56.1 |
| | | | Calculated Feed | 100.0 | 1.75 | Hg | 100.0 |
| Bornite | yes | 140 | Magnetic | 3.6 | 29.7 | Cu | 78.3 |
| | | | Nonmagnetic | 96.4 | 0.313 | Cu | 21.7 |
| | | | Calculated Feed | 100.0 | 1.38 | Cu | 100.0 |
| Arsenopyrite | yes | 125 | Magnetic | 7.4 | 1.01 | As | 31.0 |
| | | | Nonmagnetic | 92.6 | 0.18 | As | 69.0 |
| | | | Calculated Feed | 100.0 | 0.24 | As | 100.0 |
| Realgar | yes | 95 | Magnetic | 23.2 | 2.02 | As | 36.5 |
| | | | Nonmagnetic | 76.8 | 1.06 | As | 63.5 |
| | | | Calculated Feed | 100.0 | 1.28 | As | 100.0 |
| Pentlandite | yes | 105 | Magnetic | 18.2 | 0.733 | Ni | 67.4 |
| | | | Nonmagnetic | 81.8 | 0.079 | Ni | 32.6 |
| | | | Calculated Feed | 100.0 | 0.198 | Ni | 100.0 |

EXAMPLE 6

Samples of galena were made into 3 percent synthetic ores as indicated in Example 1. Each of these samples was subjected to a pretreatment and thereafter treated with 16 kilograms of ferrocene per metric ton of sample. The ferrocene was mixed with the sample and the temperature of the reactor was slowly raised to 400° C. merely to a heating to a temperature of 400° C. These samples were subjected to wet magnetic separation process. The results of these comparative samples are given below in Table 6.

TABLE 6

| Pretreatment | Product | Weight (%) | Grade (%) | Lead Distr. |
|---|---|---|---|---|
| Steam | Magnetic | 3.9 | 23.6 | 38.5 |
| | Nonmagnetic | 96.1 | 1.53 | 61.5 |
| | Calculated Feed | 100.0 | 2.39 | 100.0 |
| Steam Blank | Magnetic | 0.48 | 17.2 | 3.3 |
| | Nonmagnetic | 99.52 | 2.42 | 96.7 |
| | Calculated Feed | 100.0 | 2.49 | 100.0 |
| Heat & $N_2$ | Magnetic | 1.6 | 17.9 | 10.8 |
| | Nonmagnetic | 98.4 | 2.41 | 89.2 |
| | Calculated Feed | 100.0 | 2.66 | 100.0 |
| Heat & $N_2$ blank | Magnetic | 0.66 | 6.51 | 1.9 |
| | Nonmagnetic | 99.34 | 2.24 | 98.1 |
| | Calculated Feed | 100.0 | 2.27 | 100.0 |
| Heat & CO | Magnetic | 1.4 | 23.9 | 15.6 |
| | Nonmagnetic | 98.6 | 1.83 | 84.4 |
| | Calculated Feed | 100.0 | 2.14 | 100.0 |
| Heat & CO blank | Magnetic | 0.57 | 15.0 | 3.8 |
| | Nonmagnetic | 99.43 | 2.20 | 96.2 |
| | Calculated Feed | 100.0 | 2.27 | 100.0 |
| Heat & $H_2$ | Magnetic | 8.5 | 10.9 | 39.8 |
| | Nonmagnetic | 91.5 | 1.53 | 60.2 |
| | Calculated Feed | 100.0 | 2.33 | 100.0 |
| Heat & $H_2$ blank | Magnetic | 0.78 | 11.4 | 4.1 |
| | Nonmagnetic | 99.22 | 2.11 | 95.9 |
| | Calculated Feed | 100.0 | 2.18 | 100.0 |
| None (heated to 400° C. and ferrocene) | Magnetic | 5.1 | 9.73 | 22.7 |
| | Nonmagnetic | 94.9 | 1.79 | 77.3 |
| | Calculated Feed | 100.0 | 2.20 | 100.0 |
| None (heated to 400° C.) | Magnetic | 0.48 | 10.2 | 2.5 |
| | Nonmagnetic | 99.52 | 1.99 | 97.5 |
| | Calculated Feed | 100.0 | 2.03 | 100.0 |

EXAMPLE 7

Samples of sphalerite were made into 3 percent synthetic ores as indicated in Example 1. Each of these samples was subjected to a pretreatment and thereafter treated with 16 kilograms of ferrocene per metric ton of sample. Each of the pretreatments, i.e., steam and heat plus nitrogen, were conducted in the same manner as the pretreatments in Examples 1 and 2, respectively. The ferrocene treatment was conducted in the same manner as described in Example 6. For comparative purposes, additional samples of the same type of ore were subjected to just the pretreatment followed by magnetic separation. Samples of this ore were also given no pretreatment with one sample being subjected to only the ferrocene treatment and the other merely being heated to 400° C. All of the samples underwent a magnetic separation process. Analyses of these comparative samples are given below in Table 7.

TABLE 7

| Pretreatment | Product | Weight (%) | Grade (%) | Zinc Distr. |
|---|---|---|---|---|
| Steam | Magnetic | 8.4 | 5.60 | 25.6 |
| | Nonmagnetic | 91.6 | 1.49 | 74.4 |
| | Calculated Feed | 100.0 | 1.84 | 100.0 |
| Steam blank | Magnetic | 0.44 | 10.2 | 2.7 |
| | Nonmagnetic | 99.56 | 1.65 | 97.3 |
| | Calculated Feed | 100.0 | 1.69 | 100.0 |
| Heat & $N_2$ | Magnetic | 0.86 | 15.8 | 6.9 |
| | Nonmagnetic | 99.14 | 1.85 | 93.1 |
| | Calculated Feed | 100.0 | 1.97 | 100.0 |
| Heat & $N_2$ blank | Magnetic | 0.41 | 10.9 | 2.9 |
| | Nonmagnetic | 99.59 | 1.53 | 97.1 |
| | Calculated Feed | 100.0 | 1.57 | 100.0 |
| None (heated to 400° C. and ferrocene) | Magnetic | 4.1 | 8.59 | 21.5 |
| | Nonmagnetic | 95.9 | 1.34 | 78.5 |
| | Calculated Feed | 100.0 | 1.63 | 100.0 |
| None (heated to 400° C.) | Magnetic | 0.49 | 6.19 | 1.8 |
| | Nonmagnetic | 99.51 | 1.63 | 98.2 |
| | Calculated Feed | 100.0 | 1.65 | 100.0 |

EXAMPLE 8

Samples of molybdenite were made into 5 percent synthetic ore as indicated in Example 1. Each of these samples was subjected to a pretreatment and thereafter treated with 16 kilograms of ferrocene per metric ton of sample. Each of the pretreatments, i.e., steam, heat plus nitrogen, heat plus hydrogen and heat plus carbon monoxide were conducted in the same manner as the pretreatments in Examples 1, 2, 3 and 4, respectively. The ferrocene treatment was conducted in the manner described in Example 6. For comparative purposes, additional samples of the same type of ore were subjected to just the pretreatment followed by magnetic separation. Also, samples of this ore were given no pretreatment. One was subjected to only the ferrocene treatment, and the other was merely heated to 400° C. All of the samples were subjected to a magnetic separation process. Analyses of the products thus obtained are presented below in Table 8.

TABLE 8

| Pretreatment | Product | Weight (%) | Grade (%) | Molybdenum Distr. |
|---|---|---|---|---|
| Steam | Magnetic | 1.5 | 2.90 | 21.2 |
| | Nonmagnetic | 98.5 | 0.164 | 78.8 |
| | Calculated Feed | 100.0 | 0.205 | 100.0 |
| Steam blank | Magnetic | 0.48 | 2.73 | 7.8 |
| | Nonmagnetic | 99.52 | 0.156 | 92.2 |
| | Calculated Feed | 100.0 | 0.168 | 100.0 |
| Heat & $H_2$ | Magnetic | 1.3 | 1.54 | 11.2 |
| | Nonmagnetic | 98.7 | 0.161 | 88.8 |
| | Calculated Feed | 100.0 | 0.179 | 100.0 |
| Heat & $H_2$ blank | Magnetic | 1.05 | 2.11 | 12.7 |
| | Nonmagnetic | 98.95 | 0.154 | 87.3 |
| | Calculated Feed | 100.0 | 0.175 | 100.0 |
| Heat & CO | Magnetic | 2.0 | 1.30 | 14.2 |
| | Nonmagnetic | 98.0 | 0.160 | 85.8 |
| | Calculated Feed | 100.0 | 0.183 | 100.0 |
| Heat & CO blank | Magnetic | 0.80 | 1.58 | 7.2 |
| | Nonmagnetic | 99.20 | 0.164 | 92.8 |
| | Calculated Feed | 100.0 | 0.175 | 100.0 |
| None (heat to 400° C. and ferrocene) | Magnetic | 11.8 | 0.953 | 66.6 |
| | Nonmagnetic | 88.2 | 0.064 | 33.4 |
| | Calculated Feed | 100.0 | 0.165 | 100.0 |
| None (heat to 400° C.) | Magnetic | 0.68 | 0.961 | 4.4 |
| | Nonmagnetic | 99.32 | 0.143 | 95.6 |
| | Calculated Feed | 100.0 | 0.148 | 100.0 |

EXAMPLE 9

Samples of different minerals were made into synthetic ores as indicated in Example 1. Each of these samples was subjected to a pretreatment and thereafter treated with 16 kilograms of vaporized ferric acetylacetonate per metric ton of sample at a temperature of 270° C. for 30 minutes. The pretreatments were conducted in the same manner as described in previous examples. For comparative purposes, additional samples of the same type of ores were subjected to just the pretreatment. Also, two samples of each of these ores were given no pretreatment. One was subjected to the ferrocene treatment and the other was only heated to 270° C. All of the samples were subjected to a magnetic separation process. The results of these comparative samples are given below in Table 9.

TABLE 9

| Mineral | Pretreatment | Product | Weight (%) | Grade (%) | Metal | Metal Distr. |
|---------|-------------|---------|------------|-----------|-------|--------------|
| Galena | Steam | Magnetic | 1.2 | 8.88 | Pb | 4.8 |
| | | Nonmagnetic | 98.8 | 2.14 | Pb | 95.2 |
| | | Calculated Feed | 100.0 | 2.22 | Pb | 100.0 |
| Galena | Steam blank | Magnetic | 0.48 | 17.2 | Pb | 3.3 |
| | | Nonmagnetic | 99.52 | 2.42 | Pb | 96.7 |
| | | Calculated Feed | 100.0 | 2.49 | Pb | 100.0 |
| Galena | Heat & $N_2$ | Magnetic | 0.88 | 6.59 | Pb | 2.7 |
| | | Nonmagnetic | 99.12 | 2.13 | Pb | 97.3 |
| | | Calculated Feed | 100.0 | 2.17 | Pb | 100.0 |
| Galena | Heat & $N_2$ blank | Magnetic | 0.66 | 6.51 | Pb | 1.9 |
| | | Nonmagnetic | 99.34 | 2.24 | Pb | 98.1 |
| | | Calculated Feed | 100.0 | 2.27 | Pb | 100.0 |
| Galena | Heat & $H_2$ | Magnetic | 2.1 | 5.02 | Pb | 4.8 |
| | | Nonmagnetic | 97.9 | 2.15 | Pb | 95.2 |
| | | Calculated Feed | 100.0 | 2.21 | Pb | 100.0 |
| Galena | Heat & $H_2$ blank | Magnetic | 0.78 | 11.4 | Pb | 4.1 |
| | | Nonmagnetic | 99.22 | 2.11 | Pb | 95.9 |
| | | Calculated Feed | 100.0 | 2.18 | Pb | 100.0 |
| Galena | None (acetylacetonate at 270° C.) | Magnetic | 4.5 | 4.11 | Pb | 9.4 |
| | | Nonmagnetic | 95.5 | 1.86 | Pb | 90.6 |
| | | Calculated Feed | 100.0 | 1.96 | Pb | 100.0 |
| Galena | None (heated at 270° C.) | Magnetic | 0.52 | 6.93 | Pb | 1.9 |
| | | Nonmagnetic | 99.48 | 1.86 | Pb | 98.1 |
| | | Calculated Feed | 100.0 | 1.89 | Pb | 100.0 |
| Sphalerite | Heat & $N_2$ | Magnetic | 4.8 | 7.08 | Zn | 16.9 |
| | | Nonmagnetic | 95.2 | 1.75 | Zn | 83.1 |
| | | Calculated Feed | 100.0 | 2.01 | Zn | 100.0 |
| Sphalerite | Heat & $N_2$ blank | Magnetic | 0.41 | 10.9 | Zn | 2.9 |
| | | Nonmagnetic | 99.59 | 1.53 | Zn | 97.1 |
| | | Calculated Feed | 100.0 | 1.57 | Zn | 100.0 |
| Sphalerite | None (acetylacetonate at 270° C.) | Magnetic | 5.1 | 5.63 | Zn | 16.8 |
| | | Nonmagnetic | 94.9 | 1.52 | Zn | 83.2 |
| | | Calculated Feed | 100.0 | 1.73 | Zn | 100.0 |
| Sphalerite | None (heated to 270° C.) | Magnetic | 0.54 | 10.2 | Zn | 3.1 |
| | | Nonmagnetic | 99.46 | 1.72 | Zn | 96.9 |
| | | Calculated Feed | 100.0 | 1.77 | Zn | 100.0 |

EXAMPLE 10

Samples of sphalerite were made into 3 percent synthetic ores as indicated in Example 1. Each of these samples was subjected to a pretreatment of heat and hydrogen gas and thereafter treated with 8 kilograms of iron pentacarbonyl per metric ton of sample for 30 minutes at a temperature of 135° C. The pretreatment was carried out as described in Example 3 with the exception of time and temperature variations. The temperature and time of the pretreatment are set forth in Table 10. For comparative purposes, samples were subjected just to the pretreatment, receiving no iron carbonyl treatment. Additionally, two samples received no pretreatment with one being subjected to the iron carbonyl treatment and the other merely being heated to a temperature of 135° C. All of the samples were subjected to a wet magnetic separation process. Analyses of the products thus obtained are presented below in Table 10.

TABLE 10

| $Fe(CO)_5$ Treatment | Pretreatment Temperature (°C.) | Time (minutes) | Product | Weight (%) | Grade (%) | Zinc Distr. |
|---|---|---|---|---|---|---|
| Yes | 400 | 15 | Magnetic | 6.0 | 28.6 | 59.9 |
| | | | Nonmagnetic | 94.0 | 1.22 | 40.1 |
| | | | Calculated Feed | 100.0 | 2.86 | 100.0 |
| No | 400 | 15 | Magnetic | 0.94 | 7.76 | 3.9 |
| | | | Nonmagnetic | 99.06 | 1.83 | 96.1 |
| | | | Calculated Feed | 100.0 | 1.89 | 100.0 |
| Yes | 400 | 90 | Magnetic | 66.7 | 2.00 | 97.4 |
| | | | Nonmagnetic | 33.3 | 0.108 | 2.6 |
| | | | Calculated Feed | 100.0 | 1.37 | 100.0 |
| No | 400 | 90 | Magnetic | 1.6 | 5.90 | 4.9 |
| | | | Nonmagnetic | 98.4 | 1.85 | 95.1 |
| | | | Calculated Feed | 100.0 | 1.92 | 100.0 |
| Yes | 150 | 15 | Magnetic | 13.2 | 12.7 | 93.1 |
| | | | Nonmagnetic | 86.8 | 0.143 | 6.9 |
| | | | Calculated Feed | 100.0 | 1.80 | 100.0 |
| No | 150 | 15 | Magnetic | 0.73 | 14.8 | 6.0 |
| | | | Nonmagnetic | 99.27 | 1.71 | 94.0 |
| | | | Calculated Feed | 100.0 | 1.81 | 100.0 |
| Yes | 150 | 90 | Magnetic | 30.4 | 5.28 | 88.2 |
| | | | Nonmagnetic | 69.6 | 0.308 | 11.8 |
| | | | Calculated Feed | 100.0 | 1.82 | 100.0 |
| No | 150 | 90 | Magnetic | 0.44 | 8.58 | 2.1 |

TABLE 10-continued

| Fe(CO)$_5$ Treatment | Pretreatment Temperature (°C.) | Time (minutes) | Product | Weight (%) | Grade (%) | Zinc Distr. |
|---|---|---|---|---|---|---|
| | | | Nonmagnetic | 99.56 | 1.74 | 97.9 |
| | | | Calculated Feed | 100.0 | 1.77 | 100.0 |
| Yes | none | none | Magnetic | 36.5 | 3.50 | 70.5 |
| | | | Nonmagnetic | 63.5 | 0.842 | 29.5 |
| | | | Calculated Feed | 100.0 | 1.81 | 100.0 |
| No (heated to 135° C.) | none | none | Magnetic | 0.37 | 12.9 | 2.7 |
| | | | Nonmagnetic | 99.63 | 1.71 | 97.3 |
| | | | Calculated Feed | 100.0 | 1.75 | 100.0 |

What is claimed is:

1. In a process for the beneficiation of a sulfide ore from gangue, excluding coal, wherein the ore is treated with a metal containing compound under conditions which cause the metal containing compound to react substantially at the surface of the metal sulfide particles to the substantial exclusion of the gangue particles so as to alter the surface characteristics of the metal sulfide values thereby causing a selective enhancement of the magnetic susceptibility of one or more metal sulfide values of the ore to the exclusion of the gangue in order to permit a physical separation between the metal sulfide values and the gangue, the improvement comprising:

treating the ore with heat prior to its treatment with the metal containing compound.

2. The process of claim 1 wherein the heat pretreatment is conducted at a temperature of at least about 80° C.

3. The process of claim 2 wherein the heat pretreatment is conducted in the presence of a gas selected from the group consisting of steam, nitrogen, hydrogen, carbon monoxide, carbon dioxide, ammonia, hydrogen sulfide, sulfur dioxide, methane, air, ethane, propane, butane and other hydrocarbons in the gaseous state at the pretreatment temperature.

4. The process of claim 3 wherein the gas is employed in an amount of at least about 2 cubic meters per hour per metric ton of sulfide ore being treated.

5. The process of claim 3 wherein the gas is steam at a temperature of at least 100° C. and employed in an amount of from about 1 weight percent to about 50 weight percent water, based on the weight of the metal sulfide ore.

6. The process of claim 2 or claim 3 wherein the treatment of the ore with the metal containing compound is conducted at a temperature within a range of 125° C. less than the general decomposition temperature of the metal containing compound in a specific system for the ore being treated.

7. The process of claim 6 wherein the metal containing compound is employed in an amount of from about 0.1 to 100 kilograms per metric ton of ore.

8. In a process for the beneficiation of a metal sulfide ore from gangue, excluding coal, wherein the ore is treated with from about 0.1 to about 100 kilograms of metal containing compound per metric ton of ore at a temperature within a range of 125° C. less than the general decomposition temperature of the metal containing compound in a specific system for the ore being treated for a period of time of from about 0.05 to about 4 hours to cause the metal containing compound to react substantially at the surface of the metal sulfide particles to the substantial exclusion of the gangue particles so as to alter the surface characteristics of the metal sulfide values thereby causing a selective enhancement of the magnetic susceptibility of one or more metal sulfide values contained in the ore to the exclusion of the gangue in order to permit a physical separation, the improvement comprising:

the treatment of the ore with heat prior to treating it with the metal containing compound.

9. The process of claim 1 or claim 8 wherein the metal containing compound is an iron containing compound.

10. The process of claim 9 wherein the iron containing compound is selected from the group consisting of ferrous chloride, ferric chloride, ferrocene, ferrocene derivatives, ferric acetylacetonate, and ferric acetylacetonate derivatives.

11. The process of claim 1 or claim 8 wherein the metal containing compound is a carbonyl.

12. The process of claim 11 wherein the carbonyl is selected from the group consisting of iron, cobalt, and nickel.

13. The process of claim 12 wherein the carbonyl comprises an iron carbonyl.

14. The process of claim 9 wherein the ore is pretreated to a temperature of at least about 80° C. for a time period of at least about 0.1 hours.

15. The process of claim 14 wherein the ore is pretreated to a temperature of from about 125° C. to about 450° C. for a time period of from about 0.20 to about 4 hours.

16. The process of claim 14 wherein the heat pretreatment is conducted in the presence of a gas selected from the group consisting of steam, nitrogen, hydrogen, carbon monoxide, carbon dioxide, ammonia, hydrogen sulfide, sulfur dioxide, methane, air, ethane, propane, butane, and other hydrocarbon compounds in the gaseous state at the pretreatment temperature.

17. The process of claim 16 wherein the gas is employed in an amount of at least about 12 cubic meters per hour per metric ton of ore being processed.

18. The process of claim 16 wherein the gas is steam at a temperature of from about 150° C. to about 450° C. and comprised of from about 5 weight percent to about 30 weight percent water, based on the weight of the metal sulfide ore.

19. The process of claim 17 wherein the gas is nitrogen.

20. The process of claim 17 wherein the gas is hydrogen.

21. The process of claim 17 wherein the gas is carbon monoxide.

22. The process of claim 15 wherein the metal containing compound is an iron carbonyl and the treatment of the ore with the iron carbonyl is carried out at a temperature within a range of 15° C. less than the general decomposition temperature of the iron carbonyl in the specific system for the ore being treated.

23. The process of claim 22 wherein the ore is treated with heat and a gas selected from the group consisting of steam, nitrogen, hydrogen, and carbon monoxide.

24. The process of claim 23 wherein the metal sulfide ore is selected from the group consisting of galena, sphalerite, molybdenite, stibnite, smaltite, chalcopyrite, orpiment, cinnabar, bornite, arsenopyrite, realgar, pentlandite and tetrahedrite.

25. The process of claim 24 wherein the ore is galena.

26. The process of claim 24 wherein the ore is molybdenite.

27. The process of claim 24 wherein the ore is stibnite.

28. The process of claim 24 wherein the ore is smaltite.

29. The process of claim 24 wherein the ore is chalcopyrite.

30. The process of claim 24 wherein the ore is orpiment.

31. The process of claim 24 wherein the ore is cinnabar.

32. The process of claim 24 wherein the ore is bornite.

33. The process of claim 24 wherein the ore is arsenopyrite.

34. The process of claim 24 wherein the ore is realgar.

35. The process of claim 24 wherein the ore is pentlandite.

36. The process of claim 24 wherein the ore is tetrahedrite.

37. The process of claim 23 wherein the gas is steam.

38. In a process for the beneficiation of a metal sulfide ore from gangue, excluding coal, wherein the metal sulfide ore is selected from a group consisting of galena, molybdenite, sphalerite, bornite, cinnabar, arsenopyrite, smaltite, chalcopyrite, orpiment, realgar, pentlandite, stibnite, and tetrahedrite and wherein the ore is treated with from about 2 to about 20 kilograms of an iron containing compound per metric ton of ore at a temperature within a range of 125° C. less than the general decomposition temperature of the iron containing compound in a specific system for the ore being treated to cause the iron containing compound to react substantially at the surface of the metal sulfide particles to the substantial exclusion of the gangue particles so as to alter the surface characteristics of the metal sulfide values thereby causing a selective enhancement of the magnetic susceptibility of one or more metal sulfide values contained in the ore to the exclusion of the gangue in order to permit their magnetic separation, the improvement for the ore in a specific system comprising:

heating the ore to a temperature of at least about 80° C. prior to its treatment with the iron containing compound.

39. The process of claim 38 wherein the iron containing compound is ferrocene and the heat pretreatment is conducted in the presence of a gas selected from the group consisting of steam, nitrogen, hydrogen, and carbon monoxide.

40. The process of claim 39 wherein the ore is galena.

41. The process of claim 39 wherein the ore is sphalerite and the gas is selected from the group consisting of steam and nitrogen.

42. The process of claim 39 wherein the ore is molybdenite and the gas is selected from the group consisting of steam, hydrogen, and carbon monoxide.

43. The process of claim 38 wherein the iron containing compound is ferric acetylacetonate and the gas is selected from the group consisting of steam, nitrogen, hydrogen, and carbon monoxide.

44. The process of claim 43 wherein the ore is galena and the gas is selected from the group consisting of steam, nitrogen and hydrogen.

45. The process of claim 43 wherein the ore is sphalerite and the gas is nitrogen.

46. In a process for the beneficiation of a sulfide ore from gangue, excluding coal, wherein the ore is treated with an iron carbonyl compound under conditions which cause the iron carbonyl compound to react substantially at the surface of the metal sulfide particles to the substantial exclusion of the gangue particles so as to alter the surface characteristics of the metal sulfide values thereby causing a selective enhancement of the magnetic susceptibility of one or more metal sulfide values of the ore to the exclusion of the gangue in order to permit a separation between the metal sulfide values and the gangue, the improvement comprising:

treating the ore with heat prior to its treatment with the iron carbonyl compound.

47. The process of claim 46 wherein the heat pretreatment is conducted at a temperature of at least 80° C.

48. The process of claim 47 wherein the sulfide ore is selected from the group consisting of galena, sphalerite, molybdenite, stibnite, smaltite, chalcopyrite, orpiment, cinnabar, bornite, arsenopyrite, realgar, pentlandite and tetrahedrite.

49. The process of claim 47 or claim 48 wherein the heat pretreatment is conducted in the presence of a gas selected from the group consisting of steam, nitrogen, hydrogen, carbon monoxide, carbon dioxide, ammonia, hydrogen sulfide, sulfur dioxide, methane, air, ethane, propane, butane, and other hydrocarbons in the gaseous state at the pretreatment temperature.

50. The process of claim 49 wherein the pretreatment is conducted at a temperature of from about 175° C. to about 250° C.

51. The process of claim 49 wherein the gas is steam at a temperature of from about 150° C. to about 450° C. and comprises from about 10 weight percent to about 25 weight percent water, based on the weight of the sulfide ore being treated.

52. The process of claim 50 wherein the gas is hydrogen employed in an amount of at least 120 cubic meters per hour per metric ton of ore being treated.

53. The process of claim 50 wherein the gas is carbon monoxide employed in an amount of at least about 120 cubic meters per hour per metric ton of ore being treated.

54. The process of claim 50 wherein the gas is nitrogen employed in an amount of at least about 120 cubic meters per hour per metric ton of ore being treated.

55. The process of claim 50 wherein the iron carbonyl is iron pentacarbonyl employed in an amount of from about 2 to about 20 kilograms per metric ton of ore at a temperature of 15° C. less than the general decomposition temperature of the iron pentacarbonyl in a specific system for the ore being treated for a time of from about 0.05 to about 4 hours.

56. The process of claim 11 wherein the ore is pretreated to a temperature of at least about 80° C. for a time period of at least about 0.1 hours.

57. The process of claim 56 wherein the ore is pretreated to a temperature of from about 125° C. to about 450° C. for a time period of from about 0.20 to about 4 hours.

58. The process of claim 56 wherein the heat pretreatment is conducted in the presence of a gas selected from the group consisting of steam, nitrogen, hydrogen, carbon monoxide, carbon dioxide, ammonia, hydrogen sulfide, sulfur dioxide, methane, air, ethane, propane, butane and other hydrocarbon compounds in the gaseous state at the pretreatment temperature.

59. The process of claim 58 wherein the gas is employed in an amount of at least 12 cubic meters per hour per metric ton of ore being processed.

60. The process of claim 59 wherein the gas is steam at a temperature of from about 150° C. to about 450° C. and comprised of from about 5 weight percent to about 30 weight percent water, based on the weight of the metal sulfide ore.

61. The process of claim 59 wherein the gas is nitrogen.

62. The process of claim 59 wherein the gas is hydrogen.

63. The process of claim 59 wherein the gas is carbon monoxide.

* * * * *